US010366595B2

(12) United States Patent
Cao et al.

(10) Patent No.: US 10,366,595 B2
(45) Date of Patent: Jul. 30, 2019

(54) SURVEILLANCE METHOD AND SYSTEM BASED ON HUMAN BEHAVIOR RECOGNITION

(71) Applicant: TURING VIDEO, INC., San Mateo, CA (US)

(72) Inventors: Song Cao, San Mateo, CA (US); Yi Li, San Mateo, CA (US)

(73) Assignee: Turing Video, Inc., San Mateo, CA (US)

( * ) Notice: Subject to any disclaimer, the term of this patent is extended or adjusted under 35 U.S.C. 154(b) by 0 days.

(21) Appl. No.: 15/914,338

(22) Filed: Mar. 7, 2018

(65) Prior Publication Data

US 2018/0261071 A1 Sep. 13, 2018

Related U.S. Application Data

(60) Provisional application No. 62/469,558, filed on Mar. 10, 2017.

(51) Int. Cl.
*G08B 29/00* (2006.01)
*G08B 21/18* (2006.01)
(Continued)

(52) U.S. Cl.
CPC ........... *G08B 21/182* (2013.01); *G06F 15/76* (2013.01); *G06K 9/00288* (2013.01); *G06K 9/00295* (2013.01); *G06K 9/00335* (2013.01); *G06K 9/00771* (2013.01); *G06K 9/4628* (2013.01); *G06K 9/627* (2013.01); *G06N 5/046* (2013.01); *G06N 20/00* (2019.01); *G08B 13/19613* (2013.01); *G06K 9/6292* (2013.01)

(58) Field of Classification Search
CPC ............ G08B 21/182; G08B 13/19613; G08B 13/19615; G08B 13/196; G08B 13/19608; G08B 13/19691; G06N 5/046; G06N 20/00; G06K 9/00295; G06K 9/00771; G06F 15/18; G06F 15/76; H04L 12/2803; G06T 2207/10016; G09K 9/0028; G09K 9/00335; G09K 9/4628; G09K 9/629; G09K 9/6292
USPC .......................... 340/506, 511, 540, 541, 500
See application file for complete search history.

(56) References Cited

U.S. PATENT DOCUMENTS 9,113,052 B1 *   8/2015  Scalisi ................... H04N 7/186
2003/0210139 A1 * 11/2003  Brooks ................... B64F 1/368
                                                                340/531
(Continued)

OTHER PUBLICATIONS

Papageorgiou, C.P. et al., "A general framework for object detection," Sixth International Conference on Computer Vision, Bombay, 1998, p. 555-562.

(Continued)

*Primary Examiner* — Anh V La
(74) *Attorney, Agent, or Firm* — Sheppard Mullin Richter & Hampton LLP

(57) ABSTRACT

A surveillance method may comprise obtaining one or more alert levels, and for each of the alert levels, obtaining a user configuration of an action for responding to the alert level, training a model with marked training materials for detecting the alert level of a triggering event from a camera input, obtaining a user configuration of a time for executing the action, and obtaining a user configuration of a system for executing the action.

20 Claims, 5 Drawing Sheets

(51) Int. Cl.
*G06N 5/04* (2006.01)
*G06K 9/00* (2006.01)
*G06N 20/00* (2019.01)
*G08B 13/196* (2006.01)
*G06K 9/46* (2006.01)
*G06K 9/62* (2006.01)
*G06F 15/76* (2006.01)

(56) References Cited

U.S. PATENT DOCUMENTS

| | | | | |
|---|---|---|---|---|
| 2014/0266670 | A1* | 9/2014 | Krishnamoorthy | G08B 25/001 340/501 |
| 2015/0338447 | A1* | 11/2015 | Gallo | G01D 1/18 340/600 |
| 2018/0012463 | A1* | 1/2018 | Chaudhry | G08B 13/19608 |

OTHER PUBLICATIONS

Viola, P. et al., "Rapid Object Detection using a Boosted Cascade of Simple Features," Computer Vision and Pattern Recognition, CVPR 2001, Proceedings of the 2001 IEEE Computer Society Conference, 2001, vol. 1, p. 511-518.

Viola, P. et al., "Robust Real-Time Face Detection," International Journal of Computer Vision, 2004, vol. 57, No. 2, p. 137-154.

* cited by examiner

SURVEILLANCE METHOD AND SYSTEM BASED ON HUMAN BEHAVIOR RECOGNITION

CROSS-REFERENCE TO RELATED APPLICATION

This application claims the benefit of priority to U.S. Provisional Application No. 62/469,558, filed with the United States Patent and Trademark Office on Mar. 10, 2017, and entitled "SURVEILLANCE METHOD AND SYSTEM BASED ON HUMAN BEHAVIOR RECOGNITION," which is hereby incorporated by reference in its entirety.

TECHNICAL FIELD

The present disclosure relates to systems and methods for video surveillance, and in particular, to surveillance systems and methods based on human behavior recognition.

BACKGROUND

In recent years, video surveillance has been widely used in various domains. Consequently, demands for accurate and adaptable surveillance systems continue to grow. However, existing surveillance systems still have not overcome several hurdles.

First of all, requirements for surveillance systems vary under different scenarios, under different environments, and with different users. For example, for small-sized surveillance systems, domestic surveillance systems are only required to detect break-ins and report the situation to the user. On the other hand, surveillance systems for small businesses may be required to classify a plurality of triggering events and respond according to different alert levels. Moreover, in certain scenarios, even basic surveillance systems like domestic surveillance systems may also need to adjust its surveillance rules according to different requirements of the user. However, such diverse requirements on surveillance systems are not provided by existing surveillance systems, and therefore it is desired to develop a comprehensive solution that can adapt to various requirements.

In addition, existing surveillance systems fail to flexibly adjust and set parameters for a given scenario. Once the camera is set, the users may have limited access in defining the functions of the surveillance system. Conventionally, customized functions, if provided, merely include basic setups such as configuring timing for triggering the surveillance. Therefore, conventional surveillance systems cannot provide customized features for complicated situations at users' demand, leading to unsatisfying user experiences.

SUMMARY

According to one aspect of the disclosure, a surveillance method may comprise obtaining one or more alert levels, and for each of the alert levels, obtaining a user configuration of an action for responding to the alert level, training a model with marked training materials for detecting the alert level of a triggering event from a camera input, obtaining a user configuration of a time for executing the action, and obtaining a user configuration of a system for executing the action.

In some embodiments, the triggering event comprises detecting a stranger in the camera input. In some embodiments, the alert levels are associated with different locations of the detected stranger in a physical environment. In some embodiments, the alert levels are associated with different time periods during which the stranger is detected. In some embodiments, the alert levels are associated with different activities performed by the detected stranger. In some embodiments, the alert levels are associated with different degrees of severity for a security breach.

In some embodiments, method is executed by a local device, and the system comprises the local device. The local device couples to one or more cameras providing the camera input.

According to another aspect, a non-transitory computer-readable storage medium may store instructions that, when executed by a processor, cause the processor to perform a surveillance method. The method may comprise: obtaining one or more alert levels, and for each of the alert levels, obtaining a user configuration of an action for responding to the alert level, training a model with marked training materials for detecting the alert level of a triggering event from a camera input, obtaining a user configuration of a time for executing the action, and obtaining a user configuration of a system for executing the action. In some embodiments, the non-transitory computer-readable storage medium is comprised in a local device, and the system comprises the local device According to another aspect of the disclosure, a surveillance method may comprise: obtaining a camera input; determining a triggering event based at least in part on the camera input; determining an alert level associated with the determined triggering event based at least in part on the camera input; and executing a preset action associated with the determined alert level.

In some embodiments, the triggering event comprises detecting a stranger in the camera input. In some embodiments, the alert level associated with the determined triggering event comprises at least one of: a location of the stranger, a time of the detection of the stranger, or an activity performed by the stranger. In some embodiments, the method is executed by a local device.

It is to be understood that both the foregoing general description and the following detailed description are exemplary and explanatory only, and are not restrictive of the disclosure.

DETAILED DESCRIPTION

A web-based service IFTTT (If This Then That) can be used in various domains, such as the Internet of things (IoT).

The Internet of things (IoT) is the internetworking of physical objects embedded with electronics, software, sensors, actuators, and network connectivity that enable these objects to collect and exchange data. The IoT allows objects to be sensed and/or controlled remotely across existing network infrastructure, creating opportunities for more direct integration of the physical world into computer-based systems, and resulting in improved efficiency, accuracy, and economic benefit in addition to reduced human intervention.

For example, IFTTT can allows users to create chains of simple conditional statements called "applets," which are triggered based on changes to other web services such as Gmail, Facebook, etc. IFTTT employs the following concepts:

Services (formerly known as channels): Services are the basic building blocks of IFTTT, they mainly describe a series of data from a certain web service. It can also describe some actions controlled with certain APIs like SMS. There are particular Triggers and Actions in each channel;

Triggers: Triggers are the "this" part of an applet. They are the items that "trigger" the action;

Actions: Actions are the "that" part of an applet. They are the output that results from the input of the Trigger;

Applets (formerly known as recipes): Applets are the predicates made from Triggers and Actions; and Ingredients: Ingredients are basic data made available from a trigger.

By using IFTTT for setups, users may define the responding action for a certain triggering event of an object of interest via smart devices. Taking the event of "receiving a SMS" in cellphone for example, this event may trigger different responses under different circumstances. Accordingly, the user may define the following Triggers-Actions: if the cellphone screen is locked, when receiving a SMS, the content of the SMS will be displayed on the screen; and if the cellphone screen is unlocked, when receiving a SMS, the content of the SMS will be displayed in banner manner Such IFTTT setup allows the user to define various actions that meet the user's specific requirements.

In video surveillance domain, if an event (e.g., a stranger breaking into a house) detected by the surveillance system is regarded as a "Trigger," a major challenge that needs to be overcome is to allow the user to define the corresponding action of the "Trigger." As such, the surveillance systems can meet diverse requirements and adapt to different scenarios flexibly.

Figure 1:
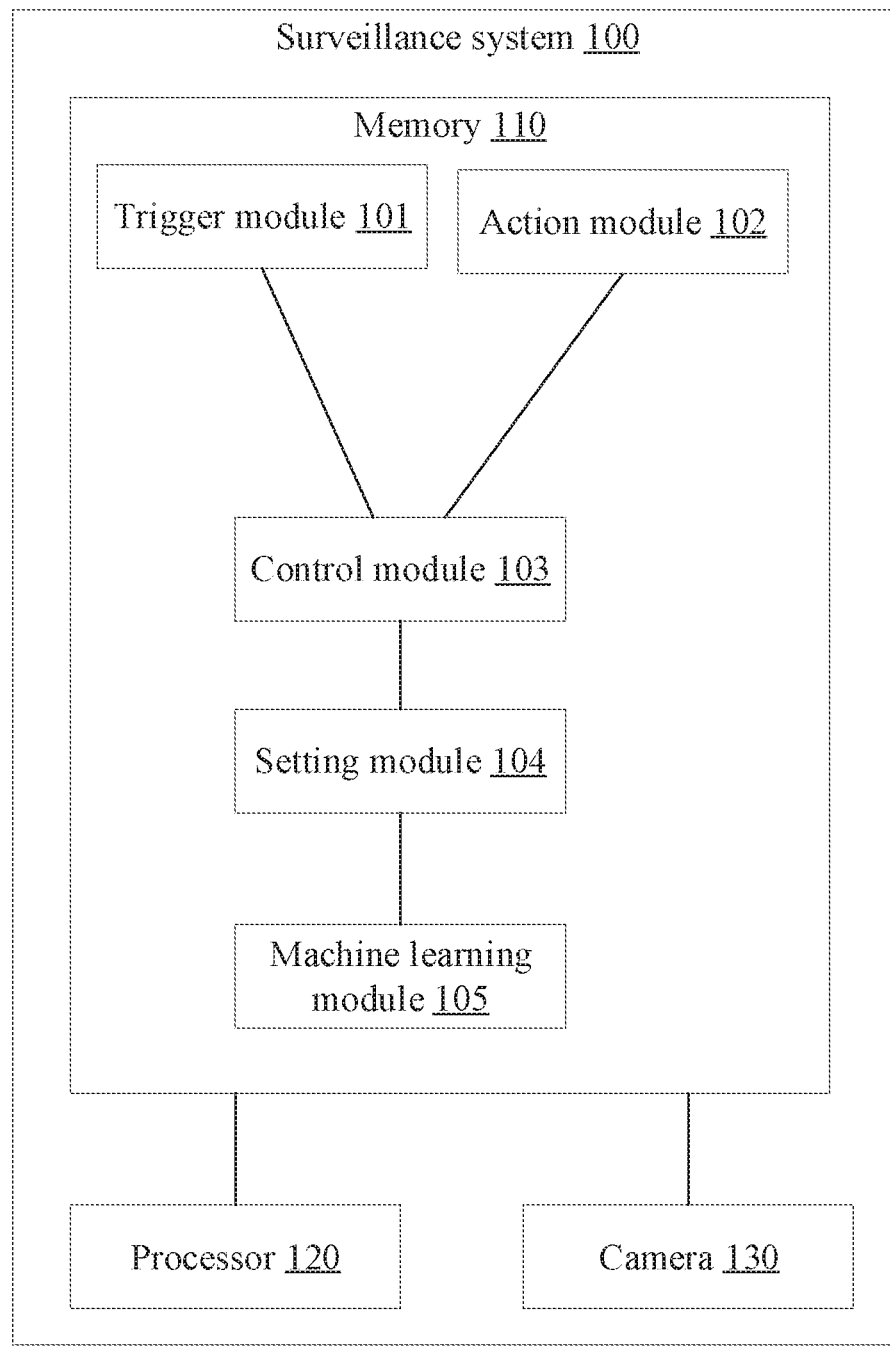
FIG. 1 illustrates a schematic diagram showing an exemplary surveillance system according to some embodiments of the present disclosure.

FIG. 1 illustrates a schematic diagram showing an exemplary surveillance system 100 according to some embodiments of the present disclosure. As shown in FIG. 1, in some embodiments, the surveillance system 100 may comprise one or more optional cameras 130, a processor 110, and a memory 120 (e.g., a non-transitory computer-readable storage medium) storing instructions that, when executed by the processor, cause the system 100 to perform various steps and methods described herein. In some embodiments, the instructions may comprise various software modules such as a trigger module 101, an action module 102, a control module 103, a setting module 104, and a machine learning module 105. The trigger module 101 may comprise one or more triggers (e.g., triggering events) that can be processed by the surveillance system. The action module 102 may comprise one or more actions in response to corresponding triggers. The control module 103 may be configured to choose a corresponding action based on a given trigger on the basis of information provided by the setting module 104. The setting module may be coupled with the above three modules, through which users may modify, define or add their own preferences. The machine learning module may be configured to learn automatically semantics, rules, or user's preferences used for surveillance. In some embodiments, the camera 130 may be disposed outside the surveillance system 100 and couple to the surveillance system 100 (e.g., via Wi-Fi). The camera 130 may comprise one or more cameras for providing camera input (e.g., by performing real-time surveillance capture). The surveillance system 100 may be implemented on a local device (e.g., a hub device coupled to multiple cameras), a cloud device, or a combination of both.

In some embodiments, the various components of the surveillance system 100 may be disposed in one or more local device and/or one or more cloud servers. In case of a distributed arrangement on local and cloud devices, the local device and the cloud device may communicate via various communication channels.

In some embodiments, the trigger module 101 comprises triggers, which may include events detected by surveillance cameras 130. The surveillance system may regard these events as triggers, based on recognition by executing various computer vision and/or machine learning algorithms For example, a face recognition algorithm can be used to identify a video-captured person's identity, and an activity recognition algorithm to recognize the person's activity. The identity and the activity of the person together form the semantics of a trigger. For example, a determination result obtained by the surveillance system based on a captured video may include "a stranger" (from executing the face recognition algorithm) and "the person is approaching a safe box" (from executing the activity recognition algorithm), which together (i.e., "a stranger is approaching a safe box") form the semantics of a triggering event. Some exemplary machine learning algorithms are described below.

Face Recognition

In some embodiments, executing the face recognition algorithm comprises training a face detection model and executing a trained face detection model to conduct face detection. In one example, the face detection model may be trained with a large pool of face images to detect the existence of a human face in a particular image or video. In one embodiment, the Viola-Jones framework may be adopted for face detection training.

In some embodiments, an exemplary method of face detection training may comprises the following steps.

Step 1: sample collection. This step is to collect a sample set (e.g., training set) comprising both face image and non-face image.

Step 2: feature extraction. Detection windows of multiple sizes can be used to traverse images in the collected sample set and calculate their Harr-like features. Further details of the Harr-like features can be referred to from the following publications, the entire contents of which are incorporated herein by reference: (1) Viola and Jones, *Rapid object detection using a boosted cascade of simple features*, Computer Vision and Pattern Recognition, 2001; (2) Papageorgiou, Oren, and Poggio, *A general framework for object detection*, International Conference on Computer Vision, 1998.

Step 3: classifier training using Adaboost algorithm. For example, a plurality of number of weak classifiers can be created corresponding to the each Haar-like feature. Then, iteratively, each of the weak classifiers can be used to classify images in the training set, and one or more of the classifiers with high accuracy can be selected. Further, the weights being assigned to the wrongly classified images can be increased for executing a next round of iteration. Accordingly, a strong classifier with higher accuracy can be obtained by combining the weak classifiers selected from each round of iteration.

Step 4: cascade detector training The strong classifiers obtained in step 3 can be arranged in cascade. That is, the strong classifiers can be arranged in multiple stages, each stage comprising a strong classifier. Thus, all the features are grouped into several stages, where each stage has one or more features. A threshold value of each stage can be set to allow most face images (e.g., 99.9%) to pass through the classifier while filtering out as much negative sample as possible. The higher the stage is, the more complicated it is set to be, namely, the classifier in a higher stage is combined by a larger number of weak classifiers and therefore is stronger in classification. The cascade detector can be trained through iteration. After each round of iteration, threshold values of each stage are adjusted according to the detection rate and false hit rate of the detector to optimize the balance between detection rate and false hit rate.

Further details of the Viola-Jones framework can be referred to from the following publications, the entire contents of which are incorporated herein by reference. (1) Viola P, Jones M., *Rapid object detection using a boosted cascade of simple features*, Computer Vision and Pattern Recognition, 2001. CVPR 2001. Proceedings of the 2001 IEEE Computer Society Conference on. IEEE, 2001, 1: I-511-1-518 vol. 1; (2) Viola P, Jones M J., *Robust real-time face detection*, International journal of computer vision, 2004, 57(2): 137-154.

In some embodiments, executing the face recognition algorithm comprises training a face recognition model and executing a trained face recognition model to conduct face recognition. The face recognition model may be trained with multiple face images, and different face images of the same person. The trained face recognition model may be implemented to identify a person from images.

In one embodiment, a method for training the same person's face recognition may comprise the following steps.

Step 1: collecting a training dataset. This step may comprise using one or more cameras (e.g., a camera 130 of a mobile terminal) to capture images of dynamic faces of one person to create a training dataset. The collected training dataset may contain various images of dynamic faces of one person.

Step 2: preliminary processing of face image. For example, eye detection can be implemented on the collected face images. Based on the result of eye detection, the face images can further go through operation such as geometric transformation, cropping, histogram equalization, and oval masking, so that the face recognition result is consistent for images captured under different conditions like brightness, angle, and illumination. Each processed image in the training dataset can be treated as an image matrix of n ×m elements (pixels), where n is the number of rows of pixels, n is the number of columns of pixels in each image, and the pixels may be represented by an integer indicating the gray value.

Step 3: mean face calculation. A mean face can be obtained through adding all the face image matrices together and dividing the sum by the number of face images.

Step 4: generating mean-subtracted image matrix. By concatenating every row of an image, an image vector for the processed images and an image vector for the mean face image can be obtained. The image vector has only a single row with n×m. By combining the image vectors of each image in the training dataset, an image matrix T can be obtained, of which each row is an image vector representing the processed images. A mean-subtracted image matrix M can be obtained through subtracting the image vector of the mean face from each row (of processed image) of the image matrix.

Step 5: covariance matrix calculation. A covariance matrix S measuring the co-relationship between the mean-subtracted image vectors in the matrix M can be calculated as $S=MM^T$.

Step 6: eigenvectors and eigenvalues calculation. Based on the covariance matrix S, eigenvector and eigenvalues of S can be obtained. The degree of dimensions of the eigenvectors are the same number as that of the processed images and can be named as eigenfaces.

Step 7: principal components selection. The largest N eigenvalues and the corresponding eigenvectors can be selected and preserved, wherein the number N is a preset threshold according to the hardware performance.

Step 8: calculating the deviations of each image from the mean face. Iteratively, each of the existing images can subtract the mean face and be projected on the eigenfaces, so that weight vectors for each existing face can be obtained respectively. The weight vectors represent the deviation of each image from the mean face and can be used in the model usage part for similarity comparison.

Activity Recognition

In some embodiments, a tree structure model named Hierarchy Pose Temporal Model (HPT) can be implemented to recognize a person's activity, for example, from a video captured by the surveillance system.

Figure 2:
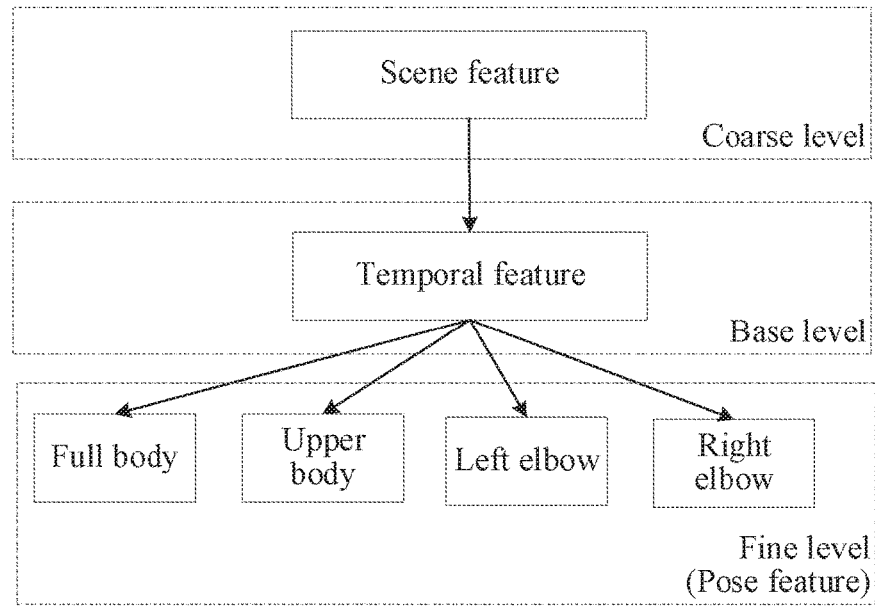
FIG. 2 illustrates an exemplary Hierarchy Pose Temporal Model (HPT) used in the surveillance system according some embodiments of the present disclosure.

Referring to FIG. 2, FIG. 2 illustrates an exemplary Hierarchy Pose Temporal Model (HPT) used in the surveillance system according some embodiments of the present disclosure. As shown in FIG. 2, given an input video, the model can first extract statistical scene features from all frames of the video at the coarse level of HPT. Then, the model can extract temporal features at the base level and pose features at the fine level. As such, the model builds a hierarchical coarse to fine framework to integrate scenes, temporal information, and pose information for fine-grained activity recognition. Here, scene information can provide general and background information in videos, and is thus used as the coarse level feature. Temporal information plays an important role from timing perspective. To utilize temporal information, the model selects several key frames from each video as the base level feature. Within each selected frame, human pose information can be very discriminative, and therefore can be used as the fine level feature.

Figure 3:
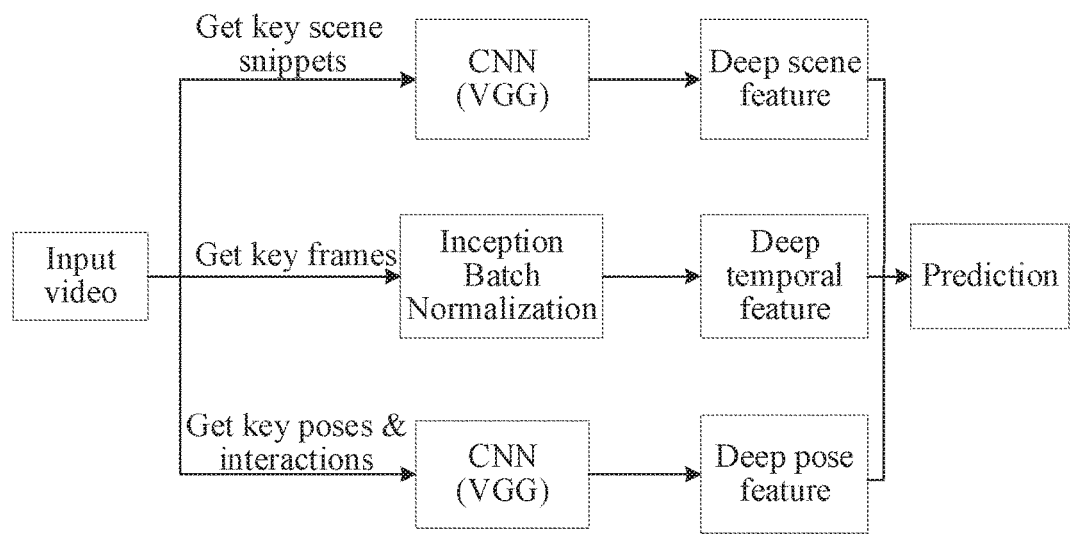
FIG. 3 illustrates an exemplary work flow of Hierarchy Pose Temporal Model (HPT) according some embodiments of the present disclosure.

Referring to FIG. 3, FIG. 3 illustrates an exemplary work flow of Hierarchy Pose Temporal Model (HPT) according some embodiments of the present disclosure.

HPT Representation

HPT representation feature F includes scene feature $F_s$, temporal feature $F_t$, human pose feature $F_p$, and deformable feature $F_d$. Accordingly, $F=[F_s, F_t, F_p, F_d]$, representing a combination of the four major components.

Scene Features $F_s$

As shown in FIG. 3, key scene snippets may be obtained from an input video, and machine learning algorithms (e.g., convolutional neural network (CNN)) may be used to obtain deep scene features from the key scenes. In some embodiments, scene features $F_s$ can be used as HPT's coarse layer. To obtain the statistical scene feature $F_s$, the HPT model may first extract raw scene feature f from each frame. The statistical scene feature $F_s$ can be described using both a static scene feature and a dynamic scene feature as $F_s=[F_s^{sta},$ $F_s^{dyn}$]. Statistical summary can be used on this coarse level information with min, max, mean, std dimension operation strategy.

In some embodiments, $F_s$ is a summarization of all the video frames, using operations such as mean, std, min and max by computing minimum or mean values for each descriptor dimension i over T video frames. Therefore, the static video descriptor $F_s^{sta}$ for RGB or for flow can be obtained by the concatenation of time-aggregated frame descriptors $f_t$, where t is the frame number. An example is shown in Equation 1. In the example, $a_i$, $b_i$, $c_i$, $d_i$ represents dimension i's output for mean, std, min, max feature operator correspondingly.

$$F_s^{sta} = [a_1, \ldots, a_k, b_1, \ldots, b_k, c_1, \ldots, c_k, d_1, \ldots, d_k] \quad (1)$$

$$a_i = \text{mean}_{1 \le t \le T} f_t(i) \quad (2)$$

$$b_i = \text{std}_{1 \le t \le T} f_t(i) \quad (3)$$

$$c_i = \min_{1 \le t \le T} f_t(i) \quad (4)$$

$$d_i = \max_{1 \le t \le T} f_t(i) \quad (5)$$

In some embodiments, to capture temporal evolution of per-frame descriptors, the HPT model accounts for temporal differences of the form $\Delta F_t = F_{t+\Delta t} - F_t$ for $\Delta t = 4$ frames. Similar to Equation 1, the HPT model computes a mean aggregation, a standard deviation aggregation, a minimum aggregation, and a maximum aggregation of $F_t$ and concatenates them into the dynamic video descriptor.

$$F_s^{dyn} = [\Delta a_1, \ldots, \Delta a_k, \Delta b_1, \ldots, \Delta b_k, \Delta c_1, \ldots, \Delta c_k, \Delta d_1, \ldots, \Delta d_k] \quad (6)$$

In some embodiments, video descriptors for motion and appearance for the whole frame and different aggregation schemes are normalized and concatenated into a Scene Feature Vector. Normalization can be performed by dividing video descriptors by the average L2-norm of the $F_t$ from a training set.

In some embodiments, the concatenation of static and dynamic descriptors is denoted by "Static+Dyn." The final dimension of the scene feature vector can be 4×4K×2×2=64K, 4K-dimensional CNN descriptor for appearance and motion (4 type feature operator, with static and dynamic features, with RGB and flow features). Such dimensionality is comparable to the size of Fisher vector used to encode dense trajectory features.

Temporal Features $F_t$

As shown in FIG. 3, key frames may be obtained from the input video, and machine learning algorithms (e.g., inception batch normalization) may be used to obtain deep temporal features from the key frames. In some embodiments, temporal features can be used as HPT base level information. For each video, the HPT model may select N frames and extract global pooling layer features using Inception Batch Normalization RGB and flow Network. Each frame can also generate a 1024-dimension feature.

Inception Batch Normalization RGB and flow Network are deep learning models fine-tuned from VGG layer models. VGG is a convolutional neural network model that achieves 92.7% top-5 test accuracy in ImageNet, which is a dataset of over 14 million images belonging to 1000 classes. The fine tuning process uses data from a UCF 101 dataset. The temporal feature can be written as $F_t = [\varphi(t_1), \ldots, \varphi(t_N)]$. Here, $\varphi(t)$ represents the feature when selecting the frame from the time t. Both RGB feature and flow feature can be extracted as modality for the temporal feature.

Human Pose Feature $F_p$

As shown in FIG. 3, key poses and interactions may be obtained from the input video, and machine learning algorithms (e.g., CNN) may be used to obtain deep pose features from the key poses and interactions. Conventionally, pose configuration (computing the distance within joint locations and inner angels) is used for activity recognition. However, traditional pose estimation results are typically not accurate enough for classifying the activity. In order to obtain a more accurate estimation result, in some embodiments, pose patches are used instead of pose configurations. Pose patches generate a much longer feature vector by describing the image and flow instead of geometry, and contain more information than directly extracting hand-crafted features from the pose configuration.

In some embodiments, four pose patches are used to obtain the human pose feature, the pose patches including: full body, upper body, left elbow, and right elbow. Both RGB and flow modality can be used. In one example, $\varphi(P, t)$ represents the feature when using pose configuration P at the time point t, each P is a configuration which is a combination for pose patches, and there are four pose patches $p_1$, $p_2$, $p_3$, and $p_4$. Thus, $\delta(p, t)$ can represent the deep feature vector where pose patch p is extracted at time point t. The combined pose feature is represented as $\varphi(P, t) = [\delta(p_1, t), \delta(p_2, t), \delta(p_3, t), \delta(p_4, t)]$. Also, $\varphi(P, t)$ can be in both RGB modality or flow modality.

Deformable Feature $F_d$

HPT framework further comprises deformable information, for compensating the cost and picking up the best frames and the best pose patches simultaneously when running the patch detectors in each potential area in the selected frame. A person of ordinary skill in the art may appreciate that the deformable feature may comprise a feature that is not bound to a fixed location in the object's model. The deformable information compensates for the variance in pose and temporal information. $\psi(P, t)$ can represent the penalty feature that uses pose configuration P in the time point t, where $\psi(P, t) = [dx, dx^2, dy, dy^2, dt, dt^2]$. Here, $[x_0, y_0, t_0]$ is the anchor position for patch $p_i$. This is a 6-dimension vector in which $dx = |x - x_0|$, $dy = |y - y_0|$, $d = |t - t_0|$ where x, y is the relative location where the patch is extracted, and t is the time point when the frame is extracted.

HPT Inference

In some embodiments, HPT inference can be used to predict the activity class for a given video and obtain the most discriminative pose patches and the most discriminative temporal information. There can be four terms in the full video feature description, $\tau(V)$ for scene feature, $\varphi(t)$ for temporal feature, $\varphi(P, t)$ for human pose feature, and $\omega(P, t)$ for deformable feature. The whole feature can be written as Equation 7.

$$F(V, A) = [\tau(V), \varphi(t_1), \ldots, \varphi(t_N), \varphi(P_1, t_1), \ldots, \varphi(P_N, t_N), \psi(P_1, t_1), \ldots, \psi(P_N, t_N)] \quad (7)$$

To combine various features for making predictions, each feature may be assigned a weight. For weights used in the HPT model, for example, $\omega_s$ is the weight for scene feature, $\omega_t$ is the weight for temporal feature, $\omega_p$ is the weight for pose feature, and $\omega_d$ is the weight for the deformable feature. The whole weight can be written as Equation 8.

$$\omega = [\omega_s, \omega_t, \omega_p, \omega_d] \quad (8)$$

The total score for the video is computed as Equation 9.

$$\text{Score }(V, A) = \omega \cdot F(V, A) \quad (9)$$

HPT Learning

For HPT learning, the HPT model uses raw features generated from deep learning models as HPT's building block. VGG model can be used for both the scene layer and pose layer. For RGB modality, the publicly available VGG network from that has been pre-trained on the ImageNet ILSVRC-2012 challenge dataset can be used. For flow patches, the motion network that has been pre-trained for action recognition task on the UCF101 dataset can be used.

For temporal layer, the HPT model uses the Inception with Batch Normalization (BN-Inception) as building block, for its good balance between accuracy and efficiency. The original BN-Inception architecture can be adapted to the design of two-stream Convolutional Neural Networks. As in the original two-stream Convolutional Neural Networks, the spatial stream Convolutional Neural Network operates on a single RGB images, and the temporal stream Convolutional Neural Network takes a s-tack of consecutive optical flow fields as input. As spatial networks take RGB images as input, models trained on the ImageNet as initialization can be used.

In some embodiments, the HPT model uses LIBSVM (a machine learning library) and the deep features from VGG and BN-Inception to obtain the initialization parameter $[\omega_s^0, \omega_t^0, \omega_p^0]$, and then puts this initial parameter into a latent SVM framework.

In some embodiments, the HPT model can be trained using latent SVM framework, in which the pose configurations and temporal locations are latent variables. The weights $\omega$t for the temporal feature, $\omega_p$ for the pose feature, and $\omega_d$ for the deformable information can be learned from the latent SVM. Given a training set of N patch configurations in which their corresponding binary class labels $y_i$ belong to [−1, 1], their feature representations can be computed to obtain dataset $(V_i, y_i), \ldots, (V_N, y_N)$. If $\omega=[\omega_s, \omega_t, \omega_p, \omega_d]$, minimization can be performed for:

$$\min_\omega \frac{1}{2}\|\omega\|^2 + C\sum_{i=1}^{N} \max(0, 1 - y_i)$$

$$f\omega(V) = \max_{P,t} \omega \cdot \Phi(V, P, t)$$

Optimization can be achieved using a Dual Coordinate Descent algorithm.

Alternatively, other activity recognition algorithms may also be suitable for conducting the complex analysis described above, and is not limited herein.

Referring back to FIG. 1, in some embodiments, the action module 102 comprises actions which respond to corresponding triggers. The actions may be preset by the surveillance system 100, such as "send an email" or "store the image," and/or defined by the user, such as "communicate with an IoT device" or "call an emergency number."

In some embodiments, the setting module 104 is configured to provide an interface for associating each trigger with a corresponding action. In one example, the provided interface may be a computer operating system interface. The user may associate each trigger with a corresponding action in a dropdown box. In another example, the interface may be a cellphone interface. The user may associate the triggers and the actions via a cellphone application. In yet another example, the interface may be a webpage. The user may log in remotely to associate the triggers and the actions. Alternatively or additionally, the setting module 104 may include other interfaces.

Further, the setting module 104 may allow the user to add new triggering events, new responding actions, or new rules for each camera 130. This customized set of rules may convert the user's requirements into simple user-interface interactions. For example, via the setting module 104, the user may define certain "acquaintance" images (e.g., a white list of images capturing people of known identities) and store these images in the system. The user may define a "non-acquaintance" event as a trigger, which may be defined as "detecting a person not in the white list." The user may associate this trigger with a responding action, for example, "send an email." The control module 103 will apply the information provided by the setting module 104 to any given trigger and perform the corresponding action. Thus, the user-defined rule can be applied automatically to the surveillance system 100. When a stranger ("non-acquaintance") is captured by the camera 130 of the surveillance system 100, the surveillance system 100 may send an email warning the user automatically. The rule defined by the user may also develop new semantics by machine learning and knowledge-based building of the surveillance system.

Figure 4:
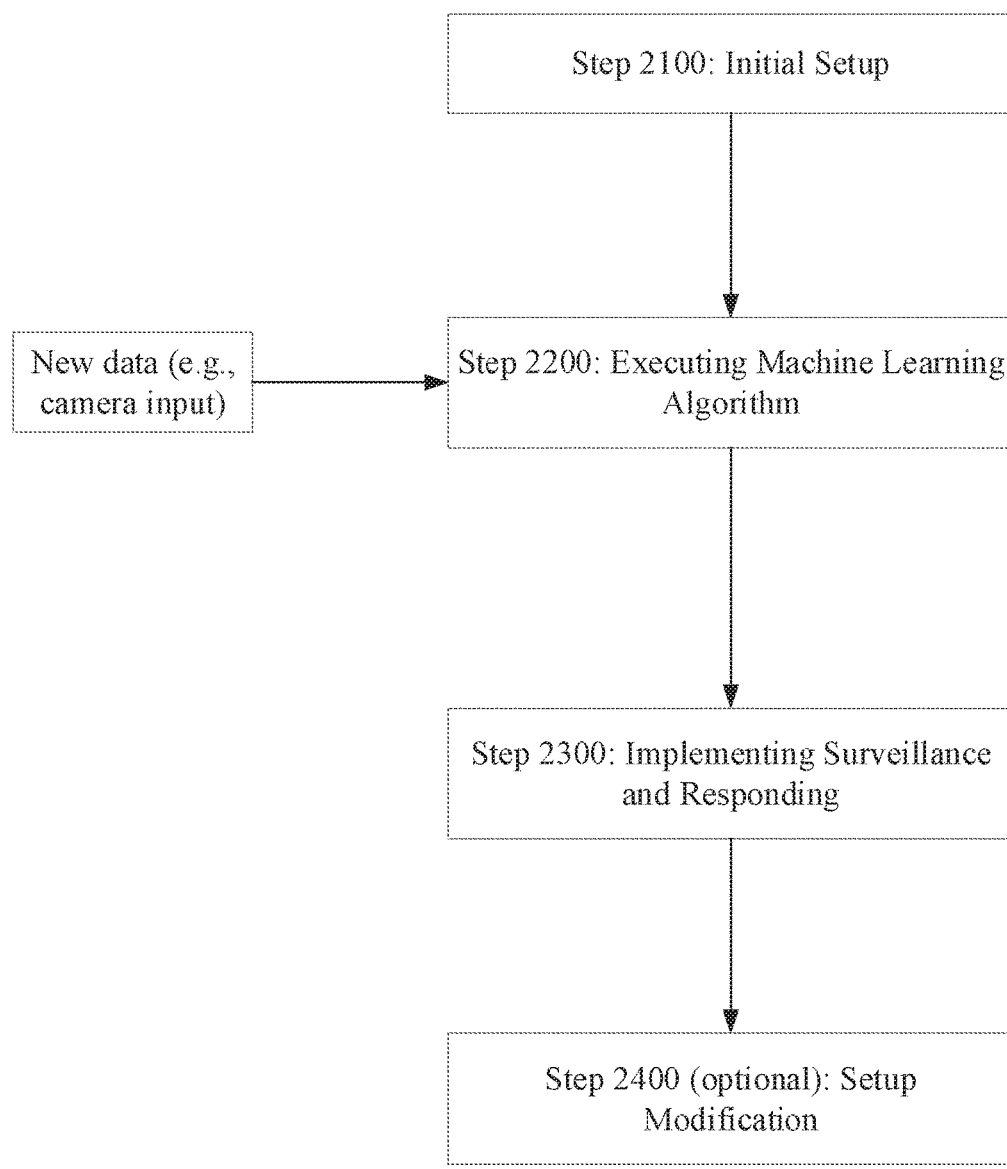
FIG. 4 illustrates an exemplary workflow of a surveillance method according some embodiments of the present disclosure.

FIG. 4 illustrates an exemplary workflow of a surveillance method 2000 according some embodiments of the present disclosure. The method 2000 may be implemented by one or more disclosed systems such as the surveillance system 100. As shown in FIG. 4, the method 2000 may include: step 2100, implementing initial setup; step 2200, executing machine learning algorithm; and step 2300, implementing surveillance and responding. Optionally, the method 2000 may further include a step 2400 to implement modification to the setups during use.

Step 2100: Initial setup

In this step, the user may define the preferable way to respond when a certain event occurs at a certain moment.

Figure 5:
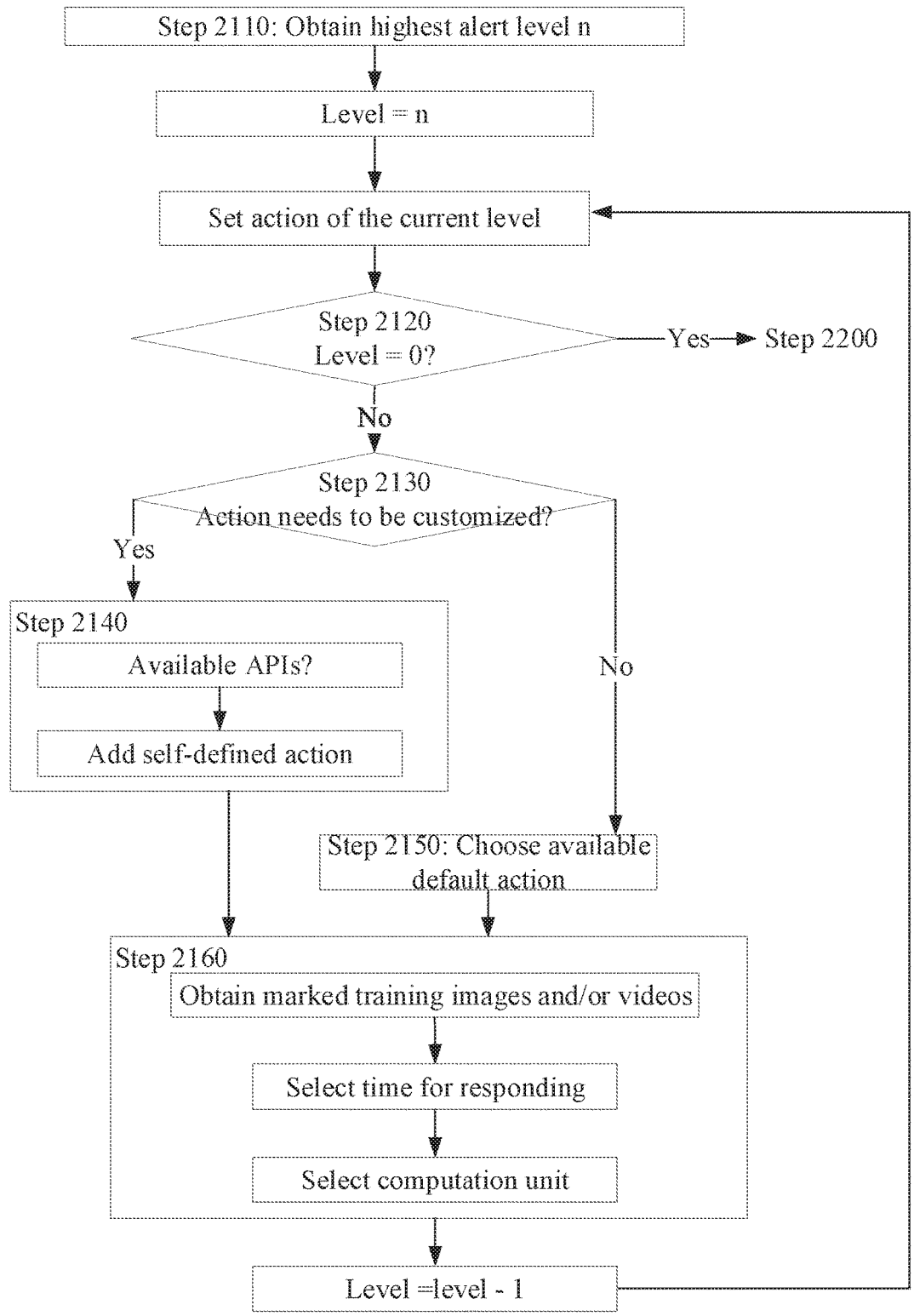
FIG. 5 illustrates an exemplary flowchart showing the initial setup process according some embodiments of the present disclosure.

Referring to FIG. 5, FIG. 5 illustrates an exemplary flowchart showing the initial setup process 2100 according some embodiments of the present disclosure. As shown in FIG. 5, the surveillance system 100 may monitor an environment for detecting defined triggering events. When detecting a triggering event, the surveillance system 100 may determine the corresponding alert level and a responding action associated with the alert level. In some embodiments, a user may define the triggering events, alert levels, and responding actions in a rule engine (e.g., by applying "if . . . , then . . . " conditions). The rule engine may be executed by the surveillance system 100 and may comprise various settings described below. For example, a triggering event of "detecting a stranger" may correspond to different alert levels under different circumstances, and may trigger different actions under the different alert levels. The user may define the each circumstance by various conditions, such as location, time, activity of the detected person, etc. The user may further define the corresponding action of each alert level, for example, from the most urgent to the least urgent. As such, the user may customize responding actions in response to detecting intrusions or other defined triggering events, and the responding actions can be automatically triggered when the events are detected.

In various embodiments, a surveillance system (e.g., a local device, a cloud device, or a combination of both) may obtain one or more alert levels, and for each of the alert levels, obtain a user configuration of an action for responding to the alert level, train a model with marked training materials for detecting the alert level of a triggering event from a camera input, obtain a user configuration of a time for executing the action, and obtain a user configuration of a system for executing the action. In some embodiments, the triggering event comprises detecting a stranger in the camera input. In some embodiments, the alert levels are associated with different locations of the detected stranger in a physical environment. In some embodiments, the alert levels are associated with different time periods during which the stranger is detected. In some embodiments, the alert levels are associated with different activities performed by the detected stranger. In some embodiments, the alert levels are associated with different degrees of severity for a security breach.

In one example, in Step 2110, the surveillance system 100 may obtain the highest alert level n associated with a detect event from an Initial Setup Interface embedded in the system, e.g., in the setting module 104. Initial Setup Interface may an rendered by a software application (e.g., an application installed in a mobile phone), and n may be configured by a user. For example, n=4 may be obtained, which means that the event has four alert levels ranging from the most urgent to the least urgent, and the action under the most urgent situation is being configured. A user may define the value n in association with one or more conditions (e.g., location, time, detected activity). For example, a user who is able to tolerate trespasser in her front yard may assign n=1 for such detected event, but assign n=4 for detecting someone breaking into her bedroom. For another example, a user may assign n=2 for detecting security b breaches during day time, but assign n=4 for detecting security breaches during night time. For another example, a user may assign n=2 for detecting a loiterer, but assign n=4 for detecting a stranger picking a lock.

In Step 2120, the surveillance system 100 may determine whether the level n equals 0. If n is determined to be 0, the initial setup process is completed and the method proceed Step 2200 in FIG. 4. If n is determined not to be 0, the method proceed to Step 2130.

In Step 2130, the surveillance system 100 may determine whether the responding action needs to be customized, that is, whether the corresponding action under the alert level n is an action predefined by the system (e.g., "sending an email," by which the system sends an email notification to the user) or an action that needs to be defined by the user (e.g., "calling person A," since the user may have to input the contact of the person A and choose calling as the contact method). If the action needs to be customized, the method proceeds to Step 2140; and if the action does not need to be customized, the method proceeds to Step 2150.

In Step 2140, API (Application Interface) actions (e.g., siren, robot action, etc.) that can be triggered by a given event are provided for selection. The surveillance system 100 can also add an API action defined by the user into a dropdown box, which can provide such defined API actions later. After this step, the method proceeds to Step 2150.

In Step 2150, the surveillance system 100 chooses the available default action under the alert level n in the action dropdown box and proceeds to 2160.

In Step 2160, the surveillance system 100 obtains a set of training images and/or videos into a designated folder or data source. The training images or videos can be marked or prepared in advance. For example, if the event is "detecting a stranger," the training images may comprise "acquaintance" images marked by the user as non-strangers and/or "non-acquaintance" images marked by the user as strangers, for identifying whether the person captured by the surveillance camera is a stranger. Similarly, the surveillance system 100 can determine other conditions (e.g., location, time, activity) associated with the stranger based on methods such as image recognition, data retrieval, etc. For example, the surveillance system 100 can determine that a stranger breaks into the kitchen at 10 am. Next, the user may select the time period for responding (e.g., day/week/month) to the event and the computation unit (e.g., a local device or a cloud server) for responding to the event. Then, the user may continue to define the responding action under the next alert level n−1 by repeating Steps 2120-2160. In this way, the corresponding action of a triggering event under each alert level (e.g., n, n−1, . . . 1) may be set by the user.

Referring back to FIG. 4, Step 2200 comprises executing machine learning algorithm. In some embodiments, the machine learning module 105 may conduct semantics learning automatically for customized surveillance. In one example, by training a model from customized sample inputs, the machine learning module 105 may explore flexible construction of algorithms and make better predictions on the new input data.

In some embodiments, the step 2200 comprises executing a face recognition algorithm to identify the person's identity. In one example, the machine learning module 105 may adopt the Viola-Jones framework as described above for training the model for better face recognition. When the initial setup step is completed, the machine learning module 105 may collect the set of training images comprising both face image and non-face image from the designated folder. Then, the machine learning module 105 may employ a variant of the machine learning algorithm AdaBoost to select the best features to train classifiers, constructing "strong" classifiers with higher accuracy. The machine learning module 105 may further conduct the cascade detector training described above to achieve better detection rates. After this training process, the machine learning module 105 may be ready for performing face recognition by executing the trained model.

In some embodiments, the surveillance system 100 may conduct machine learning for activity recognition to better recognize the person's activity. The machine learning module 105 may adopt the HPT learning method as described above for training the HPT model. In one example, when the initial setup step is completed, the machine learning module 105 may further use more raw features to train the HPT model. After this training process, the machine learning module 105 may be ready for performing better activity recognition by executing the trained HPT model.

Step 2300: Implementing Surveillance and Responding

In some embodiments, step 2300 may comprise searching a right action when a triggering event has been detected.

Figure 6:
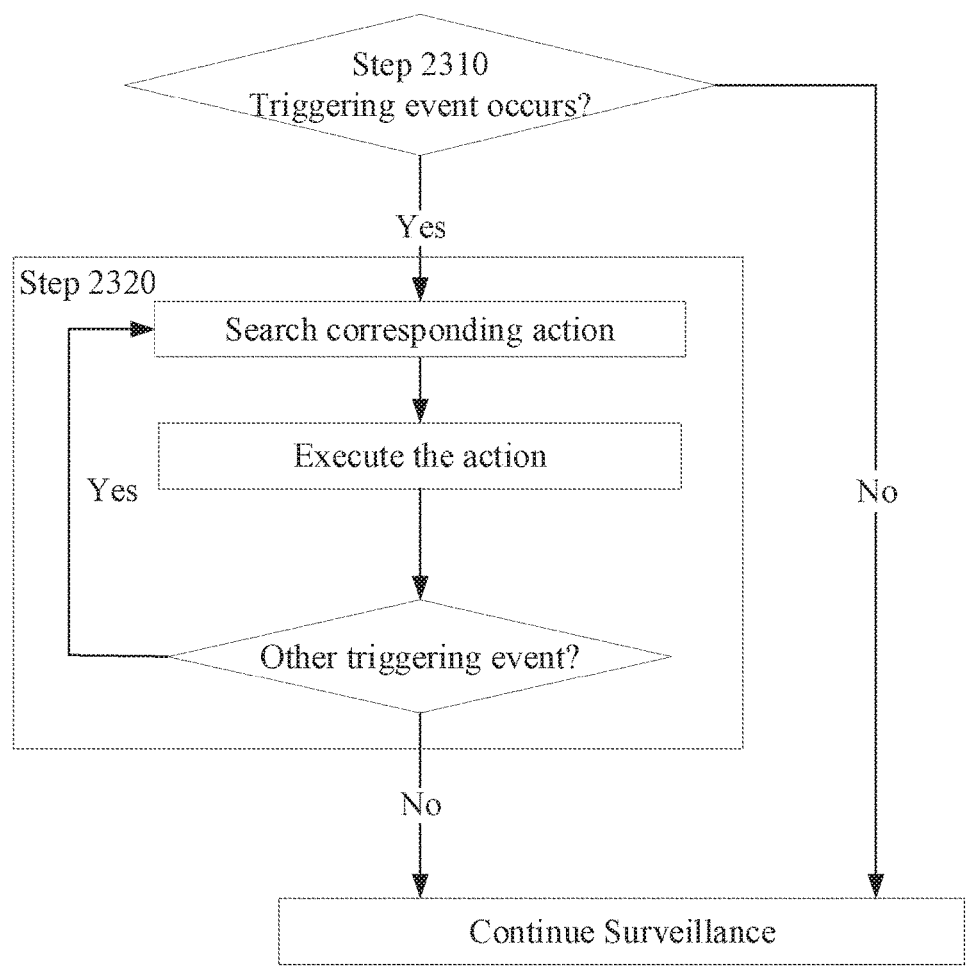
FIG. 6 illustrates an exemplary flowchart showing the surveillance and responding process according some embodiments of the present disclosure.

Referring to FIG. 6, FIG. 6 illustrates an exemplary flowchart showing the surveillance and responding process according some embodiments of the present disclosure. In some embodiment, a surveillance system (e.g., a local device) may obtain a camera input, determine a triggering event based at least in part on the camera input determine an alert level associated with the determined triggering event based at least in part on the camera input, and execute a preset action associated with the determined alert level. As is shown in FIG. 6, in Step 2310, the machine learning module 105 may detect based on the camera input whether a triggering event has occurred. If a triggering event has occurred, the method proceeds to Step 2320; and if no triggering event has occurred, the surveillance system 100 continues the surveillance.

In some embodiments, the triggering event comprises detecting a stranger in the camera input. In some embodiments, the alert level associated with the determined triggering event comprises at least one of: a location of the stranger, a time of the detection of the stranger, or an activity performed by the stranger.

In Step 2320, the surveillance system 100 searches for the responding action which corresponds to the triggering event. As mentioned above, one event may have multiple alert levels under different circumstances, therefore the surveillance system 100 may trigger different responding actions for the same detected event. For example, if the event of "detecting a stranger" is detected by the surveillance system 100, the surveillance system 100 may obtain further information to determine the n value and the responding action. For example, if further analysis of the detection reveals a trespassing action to the front yard, a low alert level of "stranger alarm" (n=1) may be triggered, and accordingly a notification may be send to the user. If further analysis of the detection reveals someone breaking into the bedroom, a high alert level of "invasion" may be triggered, and accordingly a notification may be send to the police. Therefore, in this step, the system searches for the responding action based on the triggering event and the alert level under the current circumstance.

Then, the surveillance system 100 executes the action and verifies whether there exists other triggering events that have not been processed. If there are other unprocessed events, the surveillance system 100 repeats the procedure in Step 2320; and if not, the surveillance system 100 continues the surveillance.

Referring back to FIG. 4, Step 2400 (Optional) comprises setup modification.

In some embodiments, the user may modify the initial setups in various ways. In one example, the user may change the training images or data source during use, to allow the machine learning module 105 to learn more efficiently and allow the surveillance system 100 to adapt to new conditions. For example, for the event of "detecting a stranger," the user may add new "acquaintance" images to help reduce chances of false alarm by the system. The user may also add more activity classes or recognition data to allow the system to respond more efficiently and accurately.

In another example, the user may modify or add alert levels during use, to allow the system to adjust to new circumstances.

In yet another example, the user may add new responding actions during use. For example, if the system is used in combination with a compatible robotic system, the user may add a new responding action which instruct the robot to move automatically to a region-of-interest detected by the surveillance system 100 to conduct further inspection.

As described, the disclosed surveillance system is flexible and meets diverse requirements. By simple input and selection of the user, the system can self-adapt to different scenarios. Moreover, the surveillance system can be easily applied in various fields.

Although the above-mentioned system has been described as used for human detection and surveillance, it can be applied to detect other objects, such as automobiles or animals. For example, the disclosed system may be used for detecting cars. The disclosed system may detect whether a car is presented and identify the activity of the car detected, so as to determine one or more triggering events. Then, as described above, the system may search and perform one or more corresponding actions in response to the determined triggering event. Further, those skilled in the art may understand and implement other variations of the disclosed embodiments from a study of the drawings, the specification, or the appended claims.

In the claims, the word "comprising" does not exclude other elements or steps, and the indefinite article "a" or "an" does not exclude a plurality. In applications according to present disclosure, one element may perform functions of several technical feature recited in claims Any reference signs in the claims should not be construed as limiting the scope of the disclosure.

What is claimed is:

1. A surveillance method, implementable by a computing device, comprising:
   obtaining a set of training videos;
   marking the set of training videos;
   training a model based on the marked set of training videos for detecting a triggering event from a camera input and determining an alert level of the triggering event, wherein the alert level is determined based on an activity performed by a human being that is recognized by the computing device based on a human pose feature;
   obtaining a user configuration of an action for responding to the alert level;
   obtaining a user configuration of a time for executing the action; and
   obtaining a user configuration of a system for executing the action.

2. The surveillance method of claim 1, wherein the triggering event comprises a stranger detected from the camera input.

3. The surveillance method of claim 2, wherein the alert level is determined also based on a location of the detected stranger in a physical environment.

4. The surveillance method of claim 2, wherein the alert level is determined also based on a time period during which the stranger is detected.

5. The surveillance method of claim 2, wherein the alert level is determined based on an activity performed by the detected stranger and wherein the activity is recognized also based on a deformable feature.

6. The surveillance method of claim 1, wherein the alert level is determined also based on a degree of severity for a security breach.

7. The surveillance method of claim 1, wherein the computing device implementing the method is a local device.

8. The surveillance method of claim 7, wherein the local device couples to one or more cameras providing the camera input.

9. A non-transitory computer-readable storage medium storing instructions that, when executed by a processor, cause the processor to perform a surveillance method, the method comprising:
   obtaining a set of training videos;
   marking the set of training videos;
   training a model based on the marked set of training videos for detecting a triggering event from a camera input and determining an alert level of the triggering event, wherein the alert level is determined based on an activity performed by a human being that is recognized by the computing device based on a human pose feature;
   obtaining a user configuration of an action for responding to the alert level;
   obtaining a user configuration of a time for executing the action; and
   obtaining a user configuration of a system for executing the action.

10. The non-transitory computer-readable storage medium of claim 9, wherein the triggering event comprises a stranger detected from the camera input.

11. The non-transitory computer-readable storage medium of claim 10, wherein the alert level is determined also based on a location of the detected stranger in a physical environment.

12. The non-transitory computer-readable storage medium of claim 10, wherein the alert level is determined also based on a time period during which the stranger is detected.

13. The non-transitory computer-readable storage medium of claim 10, wherein the alert level is determined based on an activity performed by the detected stranger and wherein the activity is recognized also based on a deformable feature.

14. The non-transitory computer-readable storage medium of claim 9, wherein the alert level is determined also based on a degree of severity for a security breach.

15. The non-transitory computer-readable storage medium of claim 9, wherein the non-transitory computer-readable storage medium is comprised in a local device, and the system comprises the local device.

16. The non-transitory computer-readable storage medium of claim 15, wherein the local device couples to one or more cameras providing the camera input.

17. A surveillance method, implementable by a computing device, comprising:
obtaining a camera input;
determining a triggering event and an alert level associated with the determined triggering event based at least in part on the camera input by using a machine learning model, wherein the machine learning model is trained based on a marked set of training videos for detecting the triggering event from the camera input and determining the alert level of the triggering event, wherein the alert level is determined based on an activity performed by a human being that is recognized by the computing device based on a human pose feature; and
executing a preset action associated with the determined alert level.

18. The surveillance method of claim 17, wherein the triggering event comprises a stranger detected from the camera input.

19. The surveillance method of claim 18, wherein the alert level associated with the determined triggering event is determined also based on at least one of: a location of the stranger, a time of the detection of the stranger, or an activity performed by the stranger.

20. The surveillance method of claim 17, wherein the computing device implementing the method is a local device.

* * * * *